US006753807B1

(12) United States Patent
McLaughlin et al.

(10) Patent No.: US 6,753,807 B1
(45) Date of Patent: Jun. 22, 2004

(54) COMBINATION N-WAY POWER DIVIDER/ COMBINER AND NONINVASIVE REFLECTED POWER DETECTION

(75) Inventors: Scott Andrew McLaughlin, Longmont, CO (US); Daniel Christopher Law, Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 10/207,188

(22) Filed: Jul. 30, 2002

(51) Int. Cl.[7] ............................ G01S 7/40; G01S 13/00

(52) U.S. Cl. ......................... 342/173; 342/89; 342/165; 342/175

(58) Field of Search .................... 342/20, 89, 165–175, 342/195; 333/100–137; 324/95, 126, 630, 703; 250/336.2; 257/731; 374/102

(56) References Cited

U.S. PATENT DOCUMENTS

| | | | | | |
|---|---|---|---|---|---|
| 2,464,277 | A | * | 3/1949 | Webber | 324/95 |
| 2,648,047 | A | * | 8/1953 | Hollingsworth | 324/95 |
| 2,846,647 | A | * | 8/1958 | MacPherson | 324/95 |
| 2,848,683 | A | * | 8/1958 | Jones | 324/95 |
| 2,854,627 | A | * | 9/1958 | Turner | 324/95 |
| 2,953,745 | A | * | 9/1960 | James | 324/95 |
| 3,081,430 | A | * | 3/1963 | Hopfer | 324/95 |
| 3,091,743 | A | | 5/1963 | Wilkinson | |
| 3,143,703 | A | * | 8/1964 | Kraeuter | 324/95 |
| 3,229,206 | A | * | 1/1966 | Brady et al. | 324/95 |
| 3,694,746 | A | * | 9/1972 | Hopfer | 324/95 |
| 3,904,990 | A | | 9/1975 | La Rosa | |
| 4,032,849 | A | | 6/1977 | Gysel et al. | |
| 4,223,264 | A | * | 9/1980 | Yamamura et al. | 324/95 |
| 4,262,250 | A | | 4/1981 | Legendre et al. | |
| 4,823,280 | A | * | 4/1989 | Mailandt et al. | 324/630 |
| 4,853,538 | A | * | 8/1989 | Jackson | 250/336.2 |
| 4,977,366 | A | * | 12/1990 | Powell | 324/95 |
| 5,006,846 | A | * | 4/1991 | Granville et al. | 324/126 |
| 5,021,731 | A | * | 6/1991 | Saaski et al. | 324/96 |
| 5,109,595 | A | * | 5/1992 | Wickersheim et al. | 257/731 |
| 5,110,216 | A | * | 5/1992 | Wickersheim et al. | 324/703 |
| 5,111,166 | A | | 5/1992 | Plonka et al. | 333/128 |
| 5,302,024 | A | * | 4/1994 | Blum | 324/95 |
| 5,410,281 | A | | 4/1995 | Blum | 333/127 |
| 5,880,648 | A | | 3/1999 | Aves et al. | 333/127 |
| 6,431,749 | B1 | * | 8/2002 | Tolant et al. | 374/102 |
| 6,518,743 | B1 | * | 2/2003 | Kodato | 324/95 |

OTHER PUBLICATIONS

Urlich M. Gysel, "A New N–Way Power Divider/Combiner Suitable for High Power Applications", Proc of 1975, IEEE MTT Seminar, P. 116–118.

Ernest J. Wilkinson, "A N–Way Hybrid Power Divider", IRE Transactions on Microwave Theory and Techniques (MTT), Jan. 1960, pp. 116–118.

* cited by examiner

*Primary Examiner*—Bernarr E. Gregory
(74) *Attorney, Agent, or Firm*—Robert P. Bell; John H. Raubitschek

(57) ABSTRACT

An N-way RF/microwave power divider/combiner utilizes one input and N outputs, or conversely N inputs and one output to divide (or combine) RF/microwave power while simultaneously and non-invasively measuring reflected power present due to mismatched loads or other failed components. The Gysel divider/combiner technique is used with the addition of N temperature measuring devices placed directly on the N isolation loads separated from the main divider/combiner lines. Because of high isolation between the N channels of the divider/combiner, the temperature above ambient of each isolation load is strongly correlated to the amount of power reflected back to an output port. The temperature is sensed external to the RF circuit whereby a measure of reflected power can be made without the use of invasive directional-coupler techniques. This is highly advantageous since directional-coupler techniques would increase the insertion-loss, cost, and complexity of the divider/combiner.

40 Claims, 2 Drawing Sheets

COMBINATION N-WAY POWER DIVIDER/ COMBINER AND NONINVASIVE REFLECTED POWER DETECTION

STATEMENT OF GOVERNMENT INTEREST

The invention described herein may be manufactured and used by or for the United States Government for governmental purposes without the payment of any royalties thereon.

FIELD OF THE INVENTION

The present invention relates to a microwave divider and combiner apparatus and in particular for the monitoring of the reflected power caused by external divider impedance mismatches or external combiner phase errors.

BACKGROUND OF THE INVENTION

Power dividers and combiners are used in many ways in microwave circuits. Two important examples are for combining power for transmission and for dividing power in preparation for creating separate phases for phased array antenna pointing. In either case it is highly desirable to have high insolation between output ports and to be able to dissipate all reflected power without disturbing the divider/combiner circuit through thermal heating.

In these dividers/combiners there are often separate microwave circuits comprising microwave directional couplers and microwave power measuring transducers used for the purpose of monitoring the combiner/divider and the follow-on microwave circuitry and/or antennas. These monitoring circuits may be used at the single input (for a divider) or at the single output (for a combiner) or can be duplicated N times for N outputs (for a divider) or N inputs (for a combiner). Such a monitoring method forces the use of extra parts (increasing weight, volume, and cost), increases insertion loss, and increases complexity of the original divider/combiner circuit.

As an example, transmitting phased-array antenna systems usually require that the transmitted power be divided N times and subsequently fed to different portions of the antenna array. Typical divider/combiners used are either reactive, Wilkinson, or Gysel type. The reactive divider has very poor isolation characteristics and furthermore cannot dissipate reflected power.

Wilkinson, U.S. Pat. No. 3,091,743, issued May 1963, and incorporated herein by reference, discloses a power divider. The Wilkinson type divider/combiner has high isolation but is not capable of high power use due to the layout topology of the reflect loads. As used in the present application, the terms "reflect load", "reject load" are used interchangeably and will be referred to herein as "isolation load".

In the Gysel divider/combiner (See, e.g., Gysel, "A New N-Way Power Divider/Combiner Suitable for High Power Applications", Proc of 1975, IEEE MTT Seminar, P. 116–118, incorporated herein by reference) does have high isolation characteristics with the added benefit of the ability to remote the reflect or isolation loads giving it high power capability.

After the transmitted power has been divided, the individual channels are then phased so that the antenna has the capability to "point" RF/microwave power in more than one direction. Doppler beam swinging radar wind profilers (RWP) most often use this technique. A typical RWP system may use five to six separate phases and 24 to 150 separately fed antennas, with a correspondingly disperse RF cable corporate feed system. The individual phases may be created after the initial RF division by switching in delay lines of various predetermined lengths.

Due to the number of components involved from the divider all the way to the antennas (the divider, switches, cables, other dividers, and the antennas), component failure is not an uncommon occurrence. Detection of these failures can most directly be made through the measurement of reflected power during radar transmission periods. In actual application however, the use of many directional-couplers and RF power sensing devices is rarely used due to the previously mentioned issues.

Instead, maintaining the RWP at a high performance level is usually achieved through periodic antenna probing. To find any inoperative components, the radar operations are ceased and a RF vector network analyzer is used in conjunction with an external probe to measure insertion loss and phase through all possible paths (every phase and every antenna). This procedure may be performed whenever an operator suspects improper operation or typically every 6–12 months.

SUMMARY OF THE INVENTION

The present invention combines the divider/combiner functionality and the monitoring in one package. Although it is previously known that the Gysel type divider/combiner allows for monitoring of reflected power, no previously known device has directly used the heat dissipated by a isolation load for this purpose. Previously known devices rather rely on the aforementioned directional-coupler RF power sensing circuits.

The resultant invention is much simpler, weighs less, has no additional insertion loss, and is cheaper to implement than these previously mentioned methods. And because it is implemented directly on the isolation loads of the Gysel type divider/combiner, it allows increased ability to pinpoint which divider/combiner port has the impedance mismatch. Additionally, the reliability of the radar is not decreased by the invention nor the sensitivity degraded since this monitoring technique is completely noninvasive.

This invention is intended for use in the division of power for phased array radar systems or the combination of power from separate microwave devices. The device enables the continuous noninvasive monitoring of the operation of the divider/combiner or components connected to the ports of the divider/combiner.

The device is composed of a Gysel-type RF divider/combiner with the unique and novel addition of temperature measurement transducers located directly on the isolation loads. Since the Gysel divider/combiner is an inherently high isolation device, it avails itself to monitoring of single channel outputs (or inputs when used as a combiner) in terms of their individual reflected power.

A data acquisition system is used to measure the temperature of the isolation loads and the ambient temperature close to, but not effected by, the heat from the isolation loads. The difference in temperature between a isolation load and ambient will be indicative of external or internal component failure.

The isolation loads are printed circuit board type mounted planar high power resistors. By using a thermal epoxy, the temperature transducers can be placed directly on the high-power isolation loads. This also increases the response time and increases the sensitivity for reflected power measurement. The loads are coupled to external heat sinks to dissipate the heat. By combining both divider/combiner technology and direct single channel reflected power technology the device allows for load measurement without interfering with the RF signal.

The present invention may be used for many RF/microwave power combiner or divider applications where the operator is interested in knowing the operating quality of the divider/combiner, or the follow-on devices (for a divider) or input devices (for a combiner). To illustrate, as a combiner the invention could be used to indicate the condition and efficiency of input microwave amplifiers being combined as a single high power transmitter.

Also, for example, in a radar system whereby power is divided previous to being sent into a phased array antenna, the monitoring of the isolation loads gives a clear indication of the quality of operation of the divider and the follow-on cables, other dividers, and the antenna elements themselves.

DETAILED DESCRIPTION OF THE INVENTION

Figure 2:
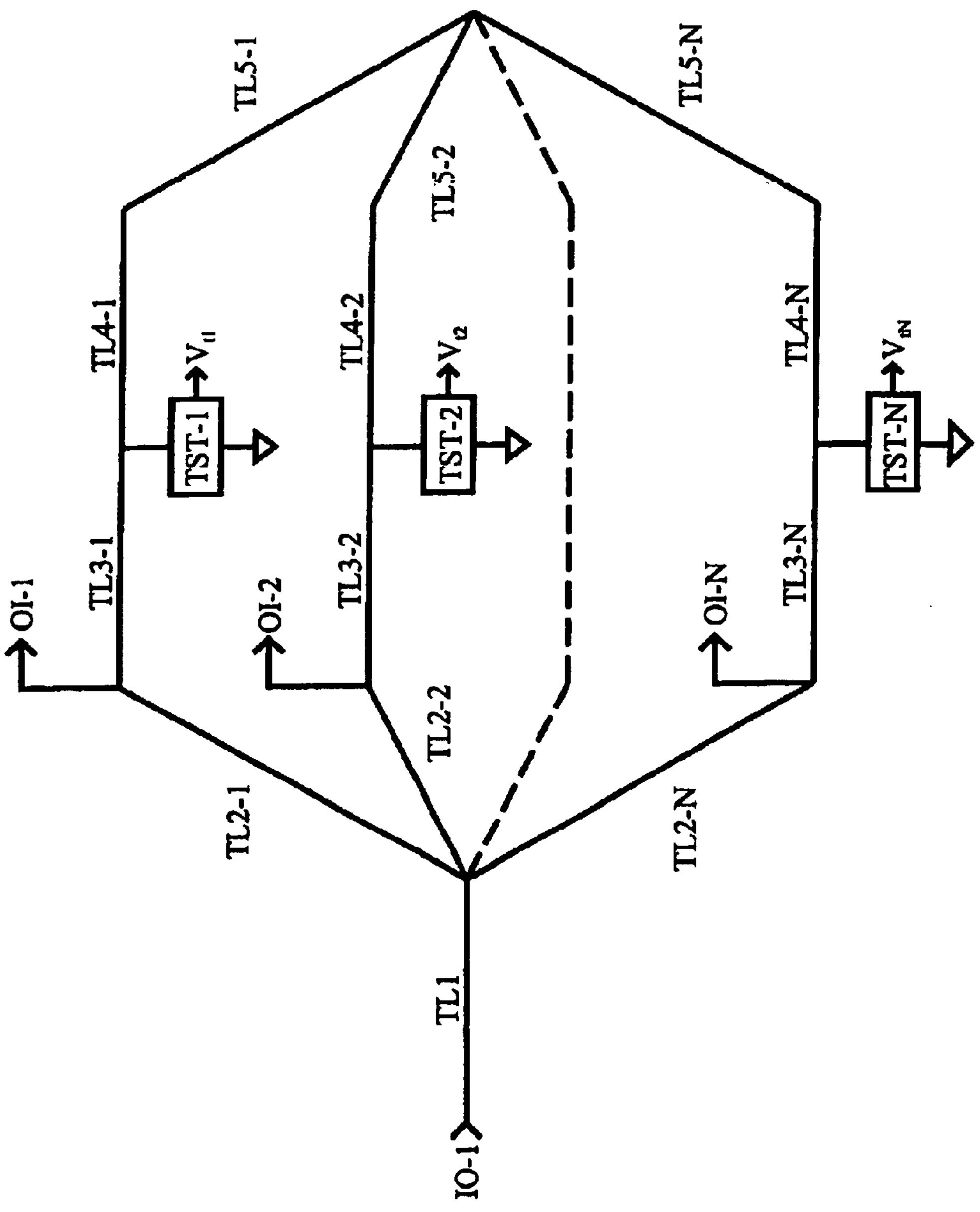
FIG. 2 is a schematic of the invention as used for a RF/microwave divider or combiner, whereby input power is split N ways or N input ports are combined, respectively.

FIG. 2 is a schematic of the invention as used for a RF/microwave divider or combiner, whereby input power is split N ways or N input ports are combined, respectively. The single input/output port is marked IO-1. The N output/input ports are marked OI-1, OI-2, . . . OI-N and are coupled to the input/output port IO-1 via corresponding transmission lines TL2-1, TL2-2, . . . TL2-N. The specialized isolation loads are designated TST-1, TST-2, . . . TST-N and are coupled to the N output/input ports via transmission lines TL3-1, TL3-2, . . . TL3-N, which in turn are all tied together at a common node via transmission lines TL4-1, TL4-2, . . . TL4-N and TL5-1, TL5-2, . . . TL5-N. TST stands for Temperature-Sensing Termination. Each TST outputs a corresponding voltage $V_{t1}$, $V_{t2}$, . . . $V_{Tn}$ indicating the status of components on the corresponding microwave circuit.

Figure 1:
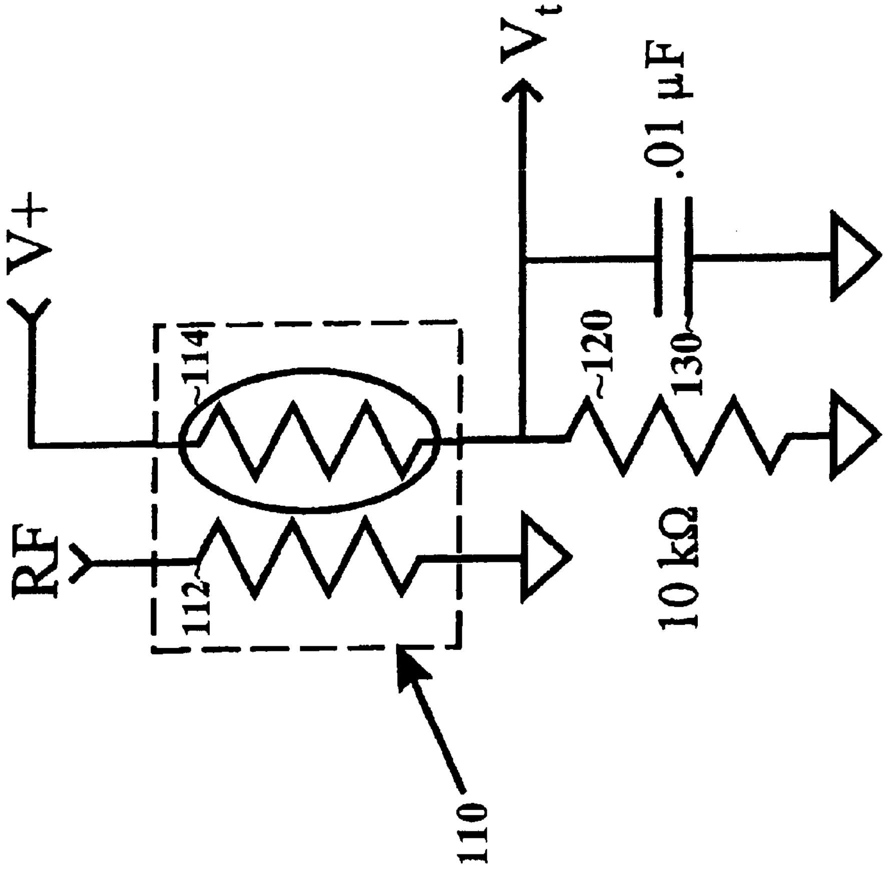
FIG. 1 a detailed schematic of the TST with a thermistor used as the temperature transducer in a preferred embodiment of the present invention.

FIG. 1 is a detailed schematic of and individual TST 110 with a thermistor 114 used as the temperature transducer (other transducers could be used such as thermocouples and the like). The RF signal from the microwave input or output is fed through isolation load. Resistance 112 represents a isolation load as would exist in a prior art combiner.

The isolation loads are printed circuit board type mounted planar high power resistors. By using a thermal epoxy, thermistor 114 may be placed directly on the high-power isolation load 112, increasing the response time and increasing the sensitivity for reflected power measurement. The loads are coupled to external heat sinks to dissipate the heat. By combining both divider/combiner technology and direct single channel reflected power technology the device allows for load measurement without interfering with the RF signal, as the isolation load is a portion of an existing circuit within the microwave system. As such, no additional signal loss is incurred, as the resistance of the circuit is largely unaltered.

Thermistor 114 is placed in proximity with isolation load 112 to measure temperature produced. Power is supplied by signal V+ and output signal $V_t$ will vary in proportion of the resistance of Thermistor 114 to resistance 120 (shown as a 10 kΩ resistor). Capacitor 130 (shown as a 0.01 μF capacitor) stabilizes the output voltage $V_t$.

Not shown in FIG. 2 is the transducer for measuring ambient temperature air surrounding the divider/combiner. $V_t$ is measured, calibrated, and converted to temperature with a separate data acquisition system. The comparison of the isolation load temperature and ambient temperature directly indicates the amount of reflected power being terminated by the isolation loads, thus giving a direct measure of both the operation of the combiner/divider and devices connected to its output ports.

A data acquisition system is used to measure the temperature of the isolation loads and the ambient temperature close to, but not affected by, the heat from the isolation loads. The difference in temperature between a isolation load and ambient will be indicative of external or internal component failure. If this difference exceeds a predetermined threshold, the data acquisition system may alert the user that a component has failed, or may automatically shut down the system to prevent further component damage.

This invention has wide applications for any RF/microwave transmitting device that uses power divider/combiners. If a Gysel power divider/combiner is used along with the isolation load temperature monitoring system, component failures can be quickly detected. As an example, for radar wind profilers, this technique has wide applications as virtually all of these systems use high power divider/combiners, and these systems often operate many months with undetected failures.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A microwave divider/combiner including a non-invasive monitoring system, comprising:

a divider/combiner including at least one isolation load;

at least one temperature sensing device, coupled to a corresponding one of the at least one isolation load, for measuring temperature of the at least one isolation load;

a monitor, coupled to the at least one temperature sensing device for monitoring temperature of the at least one isolation load, comparing the temperature of the at least one isolation load to an ambient temperature, and monitoring reflected power as a function of heat dissipated by the at least one isolation load.

2. The apparatus of claim 1, wherein the divider/combiner is a Gysel type divider/combiner.

3. The apparatus of claim 1, wherein the at least one temperature sensing device comprises at least one thermistor.

4. The apparatus of claim 3, wherein the at least one thermistor comprises at least one thermistor epoxy bonded to a corresponding one of the at least one isolation load.

5. The apparatus of claim 1, where the monitor comprises a data acquisition system which measures temperature of the at least one isolation load and ambient temperature of an area in close proximity to, but not affected by, heat from the at least one isolation load, wherein a difference in temperature between a isolation load and ambient is indicative of external or internal component failure.

6. The apparatus of claim 1, wherein the at least one isolation load comprises printed circuit board type mounted planar high power resistors and the at least one temperature sensing device comprises a temperature transducer attached by a thermal epoxy directly on the high-power isolation loads to increase response time and increase sensitivity for reflected power measurement.

7. The apparatus of claim 2, wherein the at least one temperature sensing device comprises at least one thermistor.

8. The apparatus of claim 7, wherein the at least one thermistor comprises at least one thermistor epoxy bonded to a corresponding one of the at least one isolation load.

9. The apparatus of claim 8, where the monitor comprises a data acquisition system which measures temperature of the at least one isolation load and ambient temperature of an area in close proximity to, but not affected by, heat from the at least one isolation load, wherein a difference in temperature between a isolation load and ambient is indicative of external or internal component failure.

10. The apparatus of claim 9, wherein the at least one isolation load comprises printed circuit board type mounted planar high power resistors and the at least one temperature sensing device comprises a temperature transducer attached by a thermal epoxy directly on the high-power isolation loads to increase response time and increase sensitivity for reflected power measurement.

11. A method of non-invasively monitoring a microwave system including divider/combiner including, said method, comprising the steps of:

dividing and combining a microwave signal using a divider/combiner including at least one isolation load, measuring temperature using at least one temperature sensing device coupled to a corresponding one of the at least one isolation load, monitoring the microwave system by monitoring temperature of the at least one isolation load, comparing the temperature of the at least one isolation load to an ambient temperature, and determining reflected power as a function of heat dissipated by the at least one isolation load.

12. The method of claim 11, wherein the divider/combiner is a Gysel type divider/combiner.

13. The method of claim 11, wherein the at least one temperature sensing device comprises at least one thermistor.

14. The method of claim 13, wherein the at least one thermistor comprises at least one thermistor epoxy bonded to a corresponding one of the at least one isolation load.

15. The method of claim 11, where the monitor comprises a data acquisition system, said data acquisition system performing the steps of:

measuring temperature of the at least one isolation load and ambient temperature of an area in close proximity to, but not affected by, heat from the at least one isolation load, detecting a difference in temperature between a isolation load and ambient being indicative of external or internal component failure.

16. The method of claim 11, wherein the at least one isolation load comprises printed circuit board type mounted planar high power resistors and the at least one temperature sensing device comprises a temperature transducer attached by a thermal epoxy directly on the high-power isolation loads to increase response time and increase sensitivity for reflected power measurement.

17. A microwave radar system comprising:

a microwave signal generator, for generating a microwave radar signal;

a microwave signal receiver, for receiving a reflected microwave radar signal;

at least one antenna element, coupled to the microwave signal generator and microwave signal receivers, for transmitting the microwave signal the from microwave signal generator and receiving a reflected microwave signal and passing the received microwave signal to the microwave signal receiver; and divider/combiner including a non-invasive monitoring system, coupled between the at least one antenna element and the microwave signal generator and microwave signal receiver, said divider/combiner comprising:

a divider/combiner including at least one isolation load;

at least one temperature sensing device, coupled to a corresponding one of the at least one isolation load, for measuring temperature of the at least one isolation load;

a monitor, coupled to the at least one temperature sensing device for monitoring temperature of the at least one isolation load, comparing the temperature of the at least one isolation load to an ambient temperature, and monitoring reflected power as a function of heat dissipated by the at least one isolation load.

18. The microwave radar system of claim 17, wherein the divider/combiner is a Gysel type divider/combiner.

19. The microwave radar system of claim 17, wherein the at least one temperature sensing device comprises at least one thermistor.

20. The microwave radar system of claim 19, wherein the at least one thermistor comprises at least one thermistor epoxy bonded to a corresponding one of the at least one isolation load.

21. The microwave radar system of claim 17, where the monitor comprises a data acquisition system which measures temperature of the at least one isolation load and ambient temperature of an area in close proximity to, but not affected by, heat from the at least one isolation load, wherein a difference in temperature between a isolation load and ambient is indicative of external or internal component failure.

22. The microwave radar system of claim 17, wherein the at least one isolation load comprises printed circuit board type mounted planar high power resistors and the at least one temperature sensing device comprises a temperature transducer attached by a thermal epoxy directly on the high-power isolation loads to increase response time and increase sensitivity for reflected power measurement.

23. A microwave divider/combiner including a monitoring system, comprising:

a divider/combiner including at least one isolation load;

at least one temperature sensing device, coupled to a corresponding one of the at least one isolation load, for measuring temperature of the at least one isolation load;

a monitor, coupled to the at least one temperature sensing device for monitoring temperature of the at least one isolation load, comparing the temperature of the at least one isolation load to an ambient temperature, and monitoring reflected power as a function of heat dissipated by the at least one isolation load.

24. The apparatus of claim 23, wherein the divider/combiner is a Gysel type divider/combiner.

25. The apparatus of claim 23, wherein the at least one temperature sensing device comprises at least one thermistor.

26. The apparatus of claim 25, wherein the at least one thermistor comprises at least one thermistor epoxy bonded to a corresponding one of the at least one isolation load.

27. The apparatus of claim 23 where the monitor comprises a data acquisition system which measures temperature of the at least one isolation load and ambient temperature of an area in close proximity to, but not affected by, heat from the at least one isolation load, wherein a difference in temperature between a isolation load and ambient is indicative of external or internal component failure.

28. The apparatus of claim 23, wherein the at least one isolation load comprises printed circuit board type mounted planar high power resistors and the at least one temperature sensing device comprises a temperature transducer attached by a thermal epoxy directly on the high-power isolation loads to increase response time and increase sensitivity for reflected power measurement.

29. A method of monitoring a microwave system including divider/combiner including, said method, comprising the steps of:

dividing and combining a microwave signal using a divider/combiner including at least one isolation load, measuring temperature using at least one temperature sensing device coupled to a corresponding one of the at least one isolation load, monitoring the microwave system by monitoring temperature of the at least one isolation load, comparing the temperature of the at least one isolation load to an ambient temperature, and determining reflected power as a function of heat dissipated by the at least one isolation load.

30. The method of claim 29, wherein the divider/combiner is a Gysel type divider/combiner.

31. The method of claim 29, wherein the at least one temperature sensing device comprises at least one thermistor.

32. The method of claim 29, wherein the at least one temperature sensing device comprises at least one thermistor epoxy bonded to a corresponding one of the at least one isolation load.

33. The method of claim 29, where the monitor comprises a data acquisition system, said data acquisition system performing the steps of:

measuring temperature of the at least one isolation load and ambient temperature of an area in close proximity to, but not affected by, heat from the at least one isolation load, detecting a difference in temperature between a isolation load and ambient being indicative of external or internal component failure.

34. The method of claim 29, wherein the at least one isolation load comprises printed circuit board type mounted planar high power resistors and the at least one temperature sensing device comprises a temperature transducer attached by a thermal epoxy directly on the high-power isolation loads to increase response time and increase sensitivity for reflected power measurement.

35. A microwave radar system comprising:

a microwave signal generator, for generating a microwave radar signal;

a microwave signal receiver, for receiving a reflected microwave radar signal;

at least one antenna element, coupled to the microwave signal generator and microwave signal receiver, for transmitting the microwave signal the from microwave signal generator and receiving a reflected microwave signal and passing the received microwave signal to the microwave signal receiver; and divider/combiner including a monitoring system, coupled between the at least one antenna element and the microwave signal generator and microwave signal receiver, said divider/combiner comprising:

a divider/combiner including at least one isolation load;

at least one temperature sensing device, coupled to a corresponding one of the at least one isolation load, for measuring temperature of the at least one isolation load;

a monitor, coupled to the at least one temperature sensing device for monitoring temperature of the at least one isolation load, comparing the temperature of the at least one isolation load to an ambient temperature, and monitoring reflected power as a function of heat dissipated by the at least one isolation load.

36. The microwave radar system of claim 35, wherein the divider/combiner is a Gysel type divider/combiner.

37. The microwave radar system of claim 35, wherein the at least one temperature sensing device comprises at least one thermistor.

38. The microwave radar system of claim 35, wherein the at least one temperature sensing device comprises at least one thermistor epoxy bonded to a corresponding one of the at least one isolation load.

39. The microwave radar system of claim 35 where the monitor comprises a data acquisition system which measures temperature of the at least one isolation load and ambient temperature of an area in close proximity to, but not affected by, heat from the at least one isolation load, wherein a difference in temperature between a isolation load and ambient is indicative of external or internal component failure.

40. The microwave radar system of claim 35, wherein the at least one isolation load comprises printed circuit board type mounted planar high power resistors and the at least one temperature sensing device comprises a temperature transducer attached by a thermal epoxy directly on the high-power isolation loads to increase response time and increase sensitivity for reflected power measurement.

* * * * *